(12) United States Patent
Kersey et al.

(10) Patent No.: US 11,725,984 B2
(45) Date of Patent: Aug. 15, 2023

(54) RAMAN SPECTROSCOPY-BASED OPTICAL MATCHED FILTER SYSTEM AND METHOD FOR USING THE SAME

(71) Applicant: CytoVeris Inc., Farmington, CT (US)

(72) Inventors: Alan Kersey, South Glastonbury, CT (US); Rishikesh Pandey, Unionville, CT (US); David Fournier, Northborough, MA (US); Gary Root, Cheshire, CT (US)

(73) Assignee: CytoVeris, Inc., Farmington, CT (US)

( * ) Notice: Subject to any disclaimer, the term of this patent is extended or adjusted under 35 U.S.C. 154(b) by 0 days.

(21) Appl. No.: 17/408,976

(22) Filed: Aug. 23, 2021

(65) Prior Publication Data
US 2022/0057263 A1 Feb. 24, 2022

Related U.S. Application Data

(60) Provisional application No. 63/068,582, filed on Aug. 21, 2020.

(51) Int. Cl.
*G01J 3/44* (2006.01)
*G01J 3/02* (2006.01)
(Continued)

(52) U.S. Cl.
CPC ............... *G01J 3/0208* (2013.01); *G01J 3/44* (2013.01); *G01N 21/65* (2013.01); *G02B 26/0833* (2013.01); *G01N 2201/12* (2013.01)

(58) Field of Classification Search
CPC .......... G01J 3/0208; G01J 3/44; G01N 21/65; G01N 2201/12; G02B 26/0833
See application file for complete search history.

(56) References Cited

U.S. PATENT DOCUMENTS

| | | | |
|---|---|---|---|
| 7,652,765 B1* | 1/2010 | Geshwind | G01J 3/2823 356/330 |
| 2005/0254709 A1* | 11/2005 | Geshwind | G01J 3/2823 382/182 |

(Continued)

OTHER PUBLICATIONS

Pelletier MJ. Quantitative analysis using Raman spectrometry. Appl Spectrosc. Jan. 2003;57(1):20A-42A. doi: 10.1366/000370203321165133. PMID: 14610929. (Year: 2003).*

(Continued)

*Primary Examiner* — Tarifur R Chowdhury
*Assistant Examiner* — Jonathon Cook
(74) *Attorney, Agent, or Firm* — Getz Balich LLC

(57) ABSTRACT

A system for processing Raman scattering light from a sample is provided. The system includes a source, a digital mirror device (DMD), a detector, and an analyzer. The DMD is configured to reflect Raman scattering light and includes micromirrors selectively controllable between ON and OFF states. The detector is configured to detect Raman scattering light and to produce signals representative of the Raman scattering light. The analyzer is in communication with the light source, the DMD, the detector, and a memory storing instructions, which instructions when executed cause the processor to: a) control the light source to produce a beam of light for interrogating the sample; b) control the DMD to place in an ON or OFF state based on one or more known spectral shapes stored in the memory; and c) process the Raman scattering light reflected by the micromirrors in the ON state.

20 Claims, 14 Drawing Sheets

(51) Int. Cl.
 *G01N 21/65* (2006.01)
 *G02B 26/08* (2006.01)

(56) References Cited

U.S. PATENT DOCUMENTS

| | | | |
|---|---|---|---|
| 2005/0270528 A1* | 12/2005 | Geshwind | G01J 3/021 356/330 |
| 2008/0174777 A1* | 7/2008 | Carron | G01N 21/718 356/300 |
| 2014/0107944 A1* | 4/2014 | Ben-Amotz | G01N 21/65 702/30 |
| 2014/0268139 A1* | 9/2014 | Smith | G01J 3/0272 29/592 |

OTHER PUBLICATIONS

R.A DeVerse, R.M Hammaker, W.G Fateley, Hadamard transform Raman imagery with a digital micro-mirror array, Vibrational Spectroscopy, vol. 19, Issue 2, 1999, pp. 177-186, ISSN 0924-2031 (Year: 1999).*
Inverse Raman Spectra: Induced Absorption at Optical Frequencies, W. J. Jones and B. P. Stoicheff, Phys. Rev. Lett. 13, 657—Published Nov. 30, 1964 (Year: 1964).*
Abigail S. Haka et al., "Diagnosing breast cancer by using Raman spectroscopy", PNAS,102, pp. 12371-12376, 2005.
Applications of Spatial Light Modulators in Raman Spectroscopy—Faris Sinjab, Zhiyu Liao, Ioan Notingher, 2019 (www.sagepub.com).
Buckley et al. "Applications of Raman Spectroscopy in Biopharmaceutical Manufacturing: A Short Review", Applied Spectroscopy, 71: 6, 1085-1116, 2017.
Dahr et al., "A diffuse reflectance spectral imaging system for tumor margin assessment using custom annular photodiode arrays", Biomedical Optics Express, 3, (12), 2012.
Dinish et al., "Actively targeted in vivo multiplex detection of intrinsic cancer biomarkers using biocompatible SERS nanotags", Sci Rep.; 12, 4:4075, 2014.
Macleod et al., "Deep noninvasive Raman spectroscopy of turbid media", Appl Spectrosc. 62(11): 291A-304A, 2008.
Mahadevan-Jansen et al., "Raman spectroscopy for the detection of cancers and precancers", J Biomed Opt.;1 (1 ):31-70, 1996.
Matousek et al., "Noninvasive Raman spectroscopy of human tissue in vivo," Appl. Spectrosc. 60(7), 758-763, 2006.
Nioka et al., "NIR spectroscopic detection of breast cancer", Technol Cancer Res Treat., 4(5): 497-512, 2005.

Pence I., Mahadevan-Jansen A., "Clinical instrumentation and applications of Raman spectroscopy", Chem. Soc Rev.; 45 (7):1958-1979, 2016.
Qian X, et al. In vivo tumor targeting and spectroscopic detection with surface-enhanced Raman nanoparticle tags. Nat Biotechnol. 26: 83-90, 2008.
Tummers, et al., "Real-time intraoperative detection of breast cancer using near-infrared fluorescence imaging and methylene blue", Eur J Surg Oncol., 40(7), 850-858, 2014.
Yaroslavsky. A, et al., "Delineating nonmelanoma skin cancer margins using terahertz and optical imaging", J of Biomedical Photonics & Eng , 3(1), 2017.
Fujimoto JG, "Optical coherence tomography for ultrahigh resolution in vivo imaging," Nat Biotechnol., 21(11):1361-7, 2003.
Jain, R.; et al. "Raman Spectroscopy Enables Noninvasive Biochemical Characterization and Identification of the Stage of Healing of a Wound". Analytical Chemistry. 86 (8): 3764-3772 (2014).
Jiang H et al., "Three-dimensional optical tomographic imaging of breast in a human subject", IEEE Trans Med Imaging. 20(12):1334-40, 2001.
K. Lin, et al., "Optical diagnosis of laryngeal cancer using high wavenumber Raman spectroscopy," Biosens. Bioelectron. 35(1), 213-217 (2012).
Keller M.D. et al., "Spatially offset Raman spectroscopy of layered soft tissues", Opt Lett., 34(7): 926-8, 2009.
Nguyen and Tsien, "Fluorescence-guided surgery with live molecular navigation—a new cutting edge", Nat Rev Cancer, 13(9), pp. 653-662, 2013.
Pandey et al. "Raman spectroscopy based molecular bar coding: realizing the value of high wavenumber region in breast cancer detection", Proc. SPIE 11631, Advanced Biomedical and Clinical Diagnostic and Surgical Guidance Systems XIX, 1163105 (Mar. 5, 2021); https://doi.org/10.1117/12.2578933.
Smith, E., Dent, G., "Modern Raman Spectroscopy—A Practical Approach," John Wiley & Sons, 2005.
Talari, A. et al., "Raman Spectroscopy of Biological Tissues", Applied Spectroscopy Reviews, 50:1, 46-111, 2015.
Taylor, P.D. et al., "Raman spectroscopic study of the mineral composition of cirratulid tubes (Annelida, Polychaeta)". Journal of Structural Biology, 171 (3): 402-405 (2010).
West M, Went M., "Detection of drugs of abuse by Raman spectroscopy", Drug Test Anal., 3(9): 532-8, 2010.
Stone et al., "Subsurface probing of calcifications with spatially offset Raman spectroscopy (SORS): future possibilities for the diagnosis of breast cancer", Analyst; 132(9): pp. 899-905 2007.

* cited by examiner

RAMAN SPECTROSCOPY-BASED OPTICAL MATCHED FILTER SYSTEM AND METHOD FOR USING THE SAME

This application claims priority to U.S. Patent Appln. Ser. No. 63/068,582 filed Aug. 21, 2020, which is hereby incorporated by reference in its entirety.

BACKGROUND OF THE INVENTION

1. Technical Field

The present disclosure relates to systems and methods for examining materials using Raman spectroscopy, and more specifically such systems and methods that utilize spectral recognition.

Raman spectroscopy is widely used as a method of material and compound identification in industries such as the bio-pharmaceutical industry, chemical and petrochemical sectors, security/screening, authentication, and other markets [1]. The spectral signatures observed using Raman spectroscopy arise due to the excitation of vibrational frequencies that are specific to a given chemical bond, and the optical spectrum observed in what is known as the Raman spectrum. The fingerprint region (FPR) in the wavenumber range of about 400-1800 $cm^{-1}$ provides a unique spectral fingerprint to identify different molecules and compounds. As an example, Raman spectroscopy can be used to not only identify pharmaceutical ingredients (e.g., drugs) but also to identify their polymorphic forms [2]. Raman spectroscopy has also a wide variety of applications in biology and medicine, where there is intense interest in the detection and classification of diseased tissue, such as cancer tissue [3-5], the in situ biochemical characterization of wounds [6], and the detection of circulating drugs [7]. In addition, Raman spectroscopy also has a wide usage for studying biominerals [8].

The high wavenumber (HWN) region of Raman spectrum in the wavenumber range of about 2800-3800 $cm^{-1}$ contains information relating to, for example, —NH, —CH, and —OH stretching modes and is reflective to changes in protein, lipid and water content. The relatively underappreciated HWN region typically includes a composite broad spectral shape that includes several underlying peaks associated with the biomolecular content. The HWN spectral region has been successfully demonstrated for discerning cancerous tissue from normal tissue [9,10].

In some instances, spatially offset Raman spectroscopy (SORS) [11], which is less sensitive to surface layers than conventional Raman spectroscopy, can be used to identify materials inside packaging; e.g., applications such as counterfeit drug detection that can be performed without opening the packaging. SORS has also been used to non-invasively study deeper layers in biological tissue [12,13].

There is considerable interest in the detection of diseased tissue, such as cancer tissue, using optical-based analysis approaches. Several approaches have been reported that have demonstrated the ability to optically image or assess tumor margin. These approaches include the use of diffuse optical tomography [14], diffuse reflectance spectroscopy [15], fluorescence imaging [16], near infrared spectroscopy [17], optical coherence tomography [18], Raman spectroscopy [19], and terahertz reflectivity [20]. These optical imaging and spectroscopy techniques offer great opportunity to improve breast cancer diagnosis, for example, by distinguishing benign lesions from malignant lesions, intraoperatively in real time. Owing to highly specific and molecular fingerprinting information, Raman spectroscopy, in particular, can provide significant advantage in certain biological applications because the Raman spectra do not suffer interference from water molecules, which can be an issue in infrared spectroscopy. High sensitivity Raman reporter molecules with moieties such as alkyne are also being developed for tissue imaging with SERS-labeled antibodies [21, 22].

A bio-medical application of particular interest is the determination of the boundary between normal and cancerous cells, known as the "tumor margin," in real time during surgical procedures. Current surgical techniques to resect cancer are limited by the lack of a precise method to make this determination, and as a result, the success of such surgical procedures rely on the experience and judgement of the surgeon to decide on how much tissue to remove around the tumor. To ensure the removal of all diseased tissue, surgeons often perform what is called cavity shaving, which can result in the removal of excessive amounts of healthy tissue. Conversely, if the entirety of a tumor is not removed during an initial surgery a subsequent surgery may be required to remove residual cancer tissue. This can be traumatic to the cancer patient, adding stress and potentially long-term detrimental effects on the patient outcomes. Raman spectroscopy can be used to assess the surgical margin to a depth of a couple of millimeters in tumor resection surgery. Consequently, cancer detection and diagnosis using the features of Raman spectra to distinguish benign lesions from malignant ones, intraoperatively in real time, is an area of strong research and commercial interest.

One of the challenges with Raman Spectroscopy is that the spectral signature is complex, and current techniques for analyzing such spectral signatures typically require spectrometers, expensive CCD type detector arrays for spectral acquisition, and data processing systems to analyze the spectra. What is needed is a Raman spectroscopy method and apparatus that is capable of analyzing subtle changes that can occur in a spectral response of a tissue due to disease progression, or other materials/compounds due to, for example contamination, degradation or phase changes.

SUMMARY

According to an aspect of the present disclosure, a system for processing Raman scattering light from a sample is provided. The system includes at least one light source, a digital mirror device (DMD) configured to reflect Raman scattering light, at least one detector, and an analyzer. The DMD is configured to reflect Raman scattering light and includes a plurality of micromirrors each selectively controllable between at least an ON state and an OFF state. The at least one light detector is configured to detect Raman scattering light and to produce signals representative of the detected Raman scattering light. The analyzer is in communication with the at least one light source, the DMD, the at least one detector, and a non-transitory memory storing instructions, which instructions when executed cause the processor to: a) control the at least one light source to produce a beam of light for interrogating the sample; b) control the DMD to place respective ones of the plurality of micromirrors in an ON state or an OFF state based on one or more known spectral shapes stored in the memory; and c) process the Raman scattering light reflected by the micromirrors in the ON state and detected by the detector.

In any of the aspects or embodiments described above and herein, the instructions when executed may cause the processor to control the DMD to place respective ones of the plurality of micromirrors in an ON state or an OFF state to create a pattern that is representative of the one or more known spectral shapes stored in the memory.

In any of the aspects or embodiments described above and herein, the instructions when executed may cause the processor to control the DMD to place respective ones of the plurality of micromirrors in an ON state or an OFF state to create a pattern that encompasses the one or more known spectral shapes stored in the memory.

In any of the aspects or embodiments described above and herein, the one or more known spectral shapes stored in the memory may include at least one spectral shape that is representative of a Raman spectrum having a plurality of peaks.

In any of the aspects or embodiments described above and herein, the one or more known spectral shapes stored in the memory may include at least one spectral shape that is representative of less than an entire Raman spectrum having a plurality of peaks.

In any of the aspects or embodiments described above and herein, the at least one spectral shape that is representative of less than the entire Raman spectrum may be representative of a single peak.

In any of the aspects or embodiments described above and herein, the Raman scattering light may be in a high wavenumber region of in a fingerprint region.

In any of the aspects or embodiments described above and herein, the instructions when executed may cause the processor to process the Raman scattering light, including causing the processor to quantify a level of concordance between the detected Raman scattering light and at least one of the one or more known spectral shapes.

In any of the aspects or embodiments described above and herein, the instructions when executed may cause the processor to process the Raman scattering light, including causing the processor to quantify a level of out of concordance between the detected Raman scattering light and an inverse of at least one of the one or more known spectral shapes.

In any of the aspects or embodiments described above and herein, the instructions when executed may cause the processor to process the Raman scattering light, including causing the processor to: a) quantify a level of concordance between the detected Raman scattering light and at least one of the one or more known spectral shapes; b) quantify a level of out of concordance between the detected Raman scattering light and an inverse of the at least one of the one or more known spectral shapes; and c) determine a ratio of the level of concordance and the level of out of concordance.

In any of the aspects or embodiments described above and herein, the system may include a first dispersion element configured to disperse the Raman scattering light, and the first dispersion element is disposed to receive the Raman scattering light from the sample prior to Raman scattering light being incident to the DMD.

In any of the aspects or embodiments described above and herein, the system may include a second dispersion element configured to disperse the Raman scattering light, and the second dispersion element is disposed to receive the Raman scattering light reflected from the DMD, and the second dispersion element is configured to pass the Raman scattering light directly or indirectly to the detector.

In any of the aspects or embodiments described above and herein, the system may include one or more optical elements that are configured to create an asymmetric image on the DMD, wherein the asymmetric image is such that a Raman scattering peak at a wavenumber spans in a vertical direction to align with one or more columns of the micromirrors in the DMD.

In any of the aspects or embodiments described above and herein, the instructions when executed may cause the processor to control the DMD to place respective ones of the plurality of micromirrors in an ON state or an OFF state to filter one or more peaks in a spectrum of Raman scattering light.

According to an aspect of the present disclosure, a method for processing Raman scattering light from a sample is provided that includes: a) directing a beam of light at the sample to produce Raman scattering light from the sample; b) controlling a digital mirror device (DMD), the DMD comprising a plurality of micromirrors each selectively controllable between at least an ON state and an OFF state, the controlling the DMD including placing respective ones of the plurality of micromirrors in an ON state or an OFF state based on one or more predetermined spectral shapes; c) receiving, with a detector, at least a portion of the Raman scattering light reflected by the plurality of micromirrors in the ON state, and producing signals representative of the received at least a portion of the Raman scattering light; and d) processing the Raman scattering light reflected by the micromirrors in the ON state and detected by the detector using the signals representative of the received at least a portion of the Raman scattering light.

In any of the aspects or embodiments described above and herein, the step of controlling the DMD may include placing respective ones of the plurality of micromirrors in an ON state or an OFF state to create a pattern that is representative of the one or more known spectral shapes.

In any of the aspects or embodiments described above and herein, the step of controlling the DMD may include placing respective ones of the plurality of micromirrors in an ON state or an OFF state to create a pattern that encompasses the one or more known spectral shapes.

In any of the aspects or embodiments described above and herein, the step of processing the Raman scattering light may include quantifying a level of concordance between the detected Raman scattering light and at least one of the one or more known spectral shapes.

In any of the aspects or embodiments described above and herein, the step of processing the Raman scattering light may include quantifying a level of out of concordance between the detected Raman scattering light and an inverse of at least one of the one or more known spectral shapes.

In any of the aspects or embodiments described above and herein, the step of processing the Raman scattering light may include: a) quantifying a level of concordance between the detected Raman scattering light and at least one of the one or more known spectral shapes; b) quantifying a level of out of concordance between the detected Raman scattering light and an inverse of the at least one of the one or more known spectral shapes; and c) determining a ratio of the level of concordance and the level of out of concordance.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

DETAILED DESCRIPTION

Aspects of the present disclosure include a novel and non-obvious system and method for the processing of Raman scattering light signatures which allows direct spectral feature separation and recognition in the optical domain.

Figure 1:
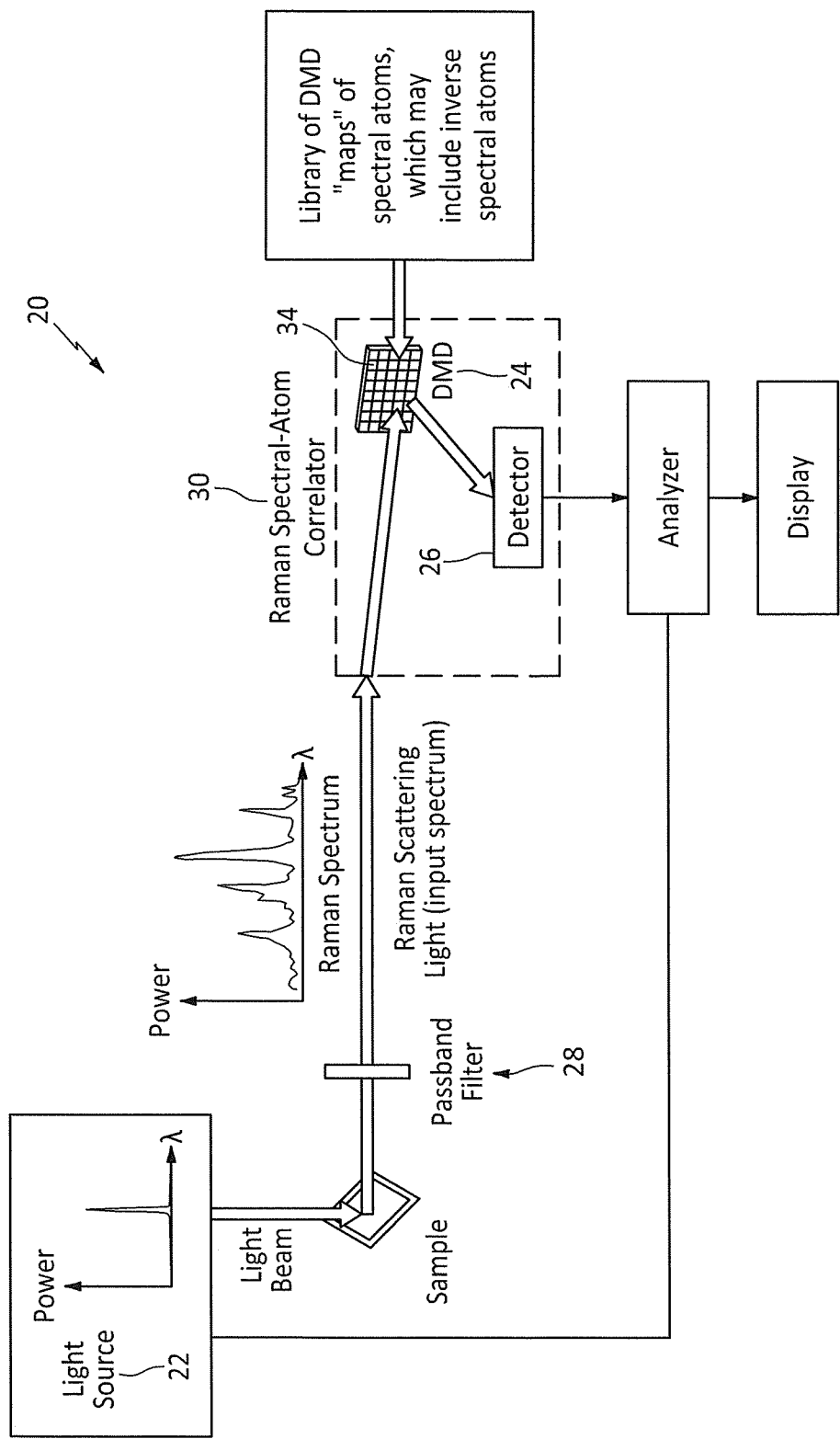
FIG. 1 is a diagrammatic representation of a present disclosure system embodiment.

A diagrammatic illustration of a present disclosure system 20 exemplary embodiment is shown in FIG. 1. The system 20 embodiments may include at least one light source 22, a digital micromirror device (DMD) 24, at least one light detector 26, optics 28, a Raman spectral-atom correlator 30, and an analyzer 32. In some embodiments, the light detector 26 and the DMD 24 may be incorporated into the Raman spectral-atom correlator 30. As will be described herein, the configuration of these components may vary in different system 20 embodiments. The system 20 embodiment description provided herein may refer to various different system components as independent components. The present disclosure is not limited to specific descriptions provided herein. For example, in alternative embodiments, system components may be combined, or arranged in a different manner than that shown in the Figures, and still be within the scope of the present disclosure.

The light source 22 is configured to emit coherent light that may be used as an incident excitation light to produce Raman scattering. Raman scattering refers to inelastic scattering in a material where there is an exchange of energy between the incident photons and the vibrational energy levels of the molecular bonds present in the material. All materials exhibit Raman scattering in response to incident light. The Raman spectrum for a given material is typically complex due to the variety of molecular bonds present within the material, and the material is identifiable based on the Raman spectrum. An exemplary Raman spectrum may include a number of different peaks at a certain wavelengths or "wavenumber" offsets from the incident light, which are uniquely characteristic of the material. Hence, the Raman spectrum of a particular material can be thought of as a "fingerprint" or "signature" of that particular material and can be used for identification purposes. Human tissue has a particularly complex Raman spectrum, and the differences in the Raman spectrum associated with normal and diseased tissue can be subtle, but reproducible. An example of an acceptable coherent light source 22 is a laser. A variety of different lasers may be used within the system 20, and the present disclosure is not therefore limited to using any particular laser. The present disclosure may utilize coherent light at a variety of different wavelengths, and the light source 22 is therefore not limited to coherent light at any particular wavelength or wavelength band. Light from the light source 22 may be transferred within the system 20 and to and from the sample via optical fibers or other type of light conduit.

The DMD 24 may include several hundred thousand (and in some instances substantially more) microscopic mirrors 34 (sometimes referred to as "micromirrors", "pixels", or "mirror-pixels") arranged in an orthogonal array. Each micromirror 34 can be controlled to pivot between an "ON" state and an "OFF" state. In an ON state, each micromirror 34 is positioned to reflect light incident to the micromirror 34 in a first direction; e.g., to deflect the light in a direction that permits collection of the reflected light for analysis of the sample. In an OFF state, each micromirror 34 is positioned to reflect light incident to the micromirror 34 in a second direction, different from the first direction; e.g., to deflect the light in a direction where will not be collected for analysis of the sample. The DMD 24 is in communication with and can be controlled by instructions stored within the analyzer 32. The present disclosure can use any DMD operable to satisfy the system 20 operations as described herein and is not therefore limited to any particular DMD.

The optics 28 may include one or more filters, mirrors, and lenses disposed to process/direct light within the system 20 that will be used to interrogate a sample, and Raman scattering collected from the sample as a result of the interrogation. The optics 28 may include one or more lenses for conditioning light directed to and/or Raman scattering collected from the sample. The optics 28 may include one or more narrow bandpass filters configured to process only light at wavelengths associated with defined Raman spectra peaks. The optics 28 may include one or more objective lenses. The optics 28 may include fiber optic links operable to act as a light conduit within the system 20. The optics 28 may include a dispersion element such as prism or grating.

The at least one light detector 26 is configured to receive Raman scattering from the interrogated sample via the optics 28 and produce signals representative thereof. The signals produced by the light detector 26 are transferred to analyzer 32. Non-limiting examples of a light detector 26 include light sensors that convert light energy into an electrical signal such as a simple photodiode, or other optical detectors of the type known in the art, such as a CCD array or a CMOS camera. In some embodiments, the light detector 26 may be a large area light detector having sufficient area to capture Raman scattering emitted from the entirety of the sample being analyzed.

The analyzer 32 is in communication with other components within the system 20, such as the light source 22, the DMD 24, and the light detector 26 to control the functions of the respective components; e.g., communicate signals to and/or from the respective components to perform the functions described herein. The analyzer 32 may include any type of computing device, computational circuit, processor(s), CPU, GPU, computer, or the like capable of executing a series of instructions that are stored in memory. The instructions may include an operating system, and/or executable software modules such as program files, system data, buffers, drivers, utilities, and the like. The executable instructions may apply to any functionality described herein to enable the system 20 to accomplish the same algorithmically and/or coordination of system components. The analyzer 32 may include a single memory device or a plurality of memory devices. The present disclosure is not limited to any particular type of non-transitory memory device, and may include read-only memory, random access memory, volatile memory, non-volatile memory, static memory, dynamic memory, flash memory, cache memory, and/or any device that stores digital information. The analyzer 32 may include, or may be in communication with, an input device that enables a user to enter data and/or instructions, and may include, or be in communication with, an output device configured, for example to display information (e.g., a visual display or a printer), or to transfer data, etc. Communications between the analyzer 32 and other system components (e.g., the light source 22, light detector 26, etc.) may be via a hardwire connection or via a wireless connection.

Raman signature processing under the present disclosure can be done for the whole spectrum, for example, as a "matched filter" form of processing (spectral atoms), or on partial fragments of the spectrum to look at particular set of spectral features of the full spectrum, or in a chosen spectral range contained within the overall spectrum (sub-atoms) [23]. The characteristics (intensity, peak width peak area or combination thereof) of the Raman spectrum or portions thereof can serve to directly assess the type of tissue or the spectral characteristics of each atom, or sub-atoms can be fed into a machine learning algorithm to assess the spectral content and classify the type of tissue (or material sample) under investigation.

Referring to FIGS. 2-4B, embodiments of the present disclosure system 20 may include a Raman spectral-atom correlator 30 having a DMD 24 and a light detector 26. U.S. Pat. No. 7,019,883 discloses a device for use in telecommunications that includes one or more dispersive elements and one or more detectors. U.S. Pat. No. 7,019,883 is hereby incorporated by reference in its entirety. The DMD 24 and light detector 26 of the present Raman spectral-atom correlator 30 form an adaptive/programmable element of a matched filter. As will be described herein, the present system 20 generates "atoms" or "sub-atoms" in a spectral domain. Owing to the high reflectivity and the high fill factor, DMDs are suitable for high-throughput detection of otherwise weak spontaneous Raman signal. Further, DMDs have been employed in Raman spectroscopy for several purposes such as modulation of the laser excitation and spectral modulation of the Raman scattering light for compressive sampling and fluorescence-rejection [24].

Figure 2:
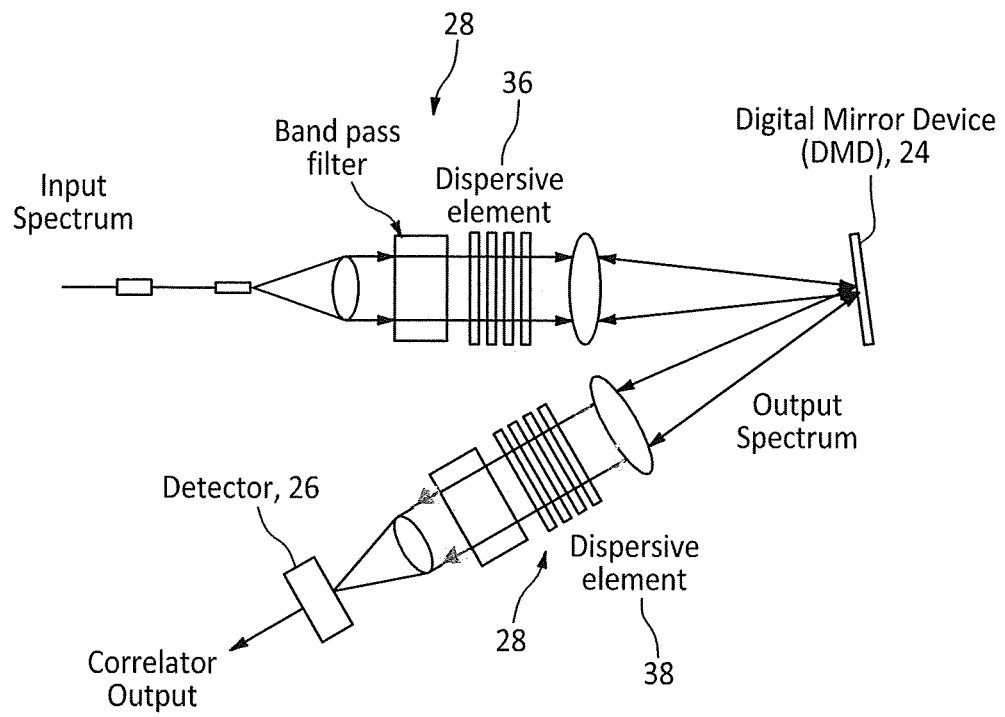
FIG. 2 schematically illustrates an exemplary Raman spectral-atom correlator portion of a present disclosure system.

In some of the present disclosure system 20 embodiments, Raman scattering light from a sample (produced by excitation light from the light source 22) is directed through an optical train that includes a first dispersion element 36 and may also include a second dispersion element 38. Non-limiting examples of dispersion elements include a diffraction grating, prisms, and the like. In those embodiments that include first and second dispersion elements 36, 38 (e.g., as shown in FIG. 2), the first dispersion element 36 disperses the spectral content of the Raman spectrum onto the surface of the DMD 24 array. In these embodiments, at least some Raman scattering light reflected by micromirrors 34 within the DMD 24 is directed to the second dispersion element 38 and the resulting combined spectral signal impinges directly or indirectly (e.g., via a fiber optical coupling) on the detector 26.

Figure 3:
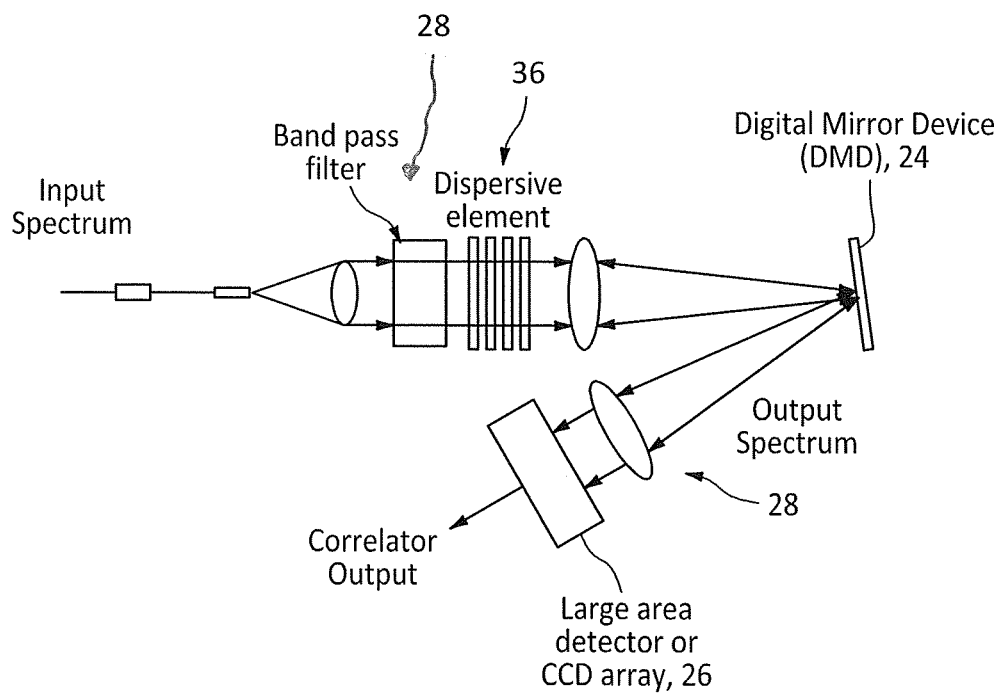
FIG. 3 schematically illustrates an exemplary Raman spectral-atom correlator portion of a present disclosure system.

Referring to FIG. 3, some embodiments of the present disclosure system 20 may be configured such that Raman scattering light reflected off in the ON state of DMD micromirrors 34 are incident directly, or via a focusing lens system, onto a wide area detector system, such as a CCD array. These system 20 embodiments are typically not used to evaluate the spectra content of the collected Raman scattering light (although this could be done as part of this system 20), but rather are typically used to bin all the CCD elements to provide a "total optical power" measurement.

In some embodiments, the system 20 may be configured in a "reflective mode" such that Raman scattering light follows a light input path to the DMD 24, passing through a beam-splitter or "circulator" device prior to encountering the DMD 24 (not shown), and at least a portion of that Raman scattering light is reflected back along the DMD 24 light input path, and the beam-splitter or "circulator" device is configured to separate the DMD reflected Raman scattering light from the input path and onto the light detector 26.

Figure 4A:
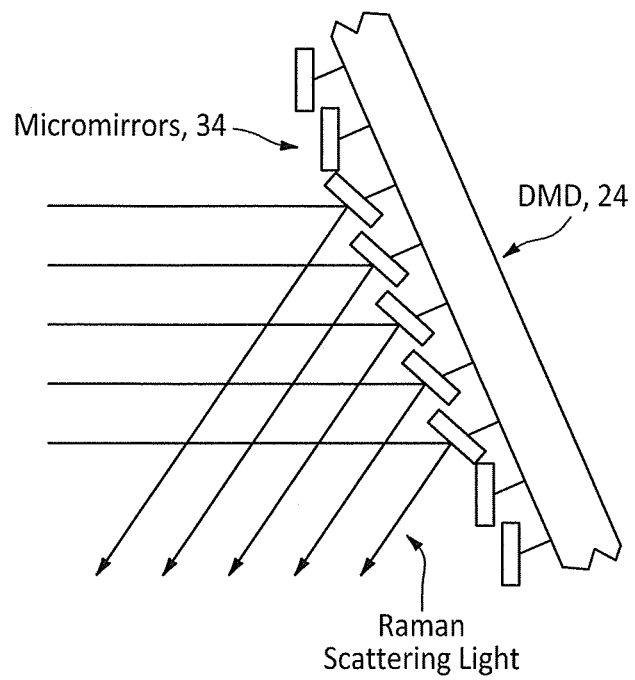
FIG. 4A schematically illustrates a micromirror array having certain micromirrors in an "on" state, in accordance with one or more aspects of the present disclosure.
Figure 4B:
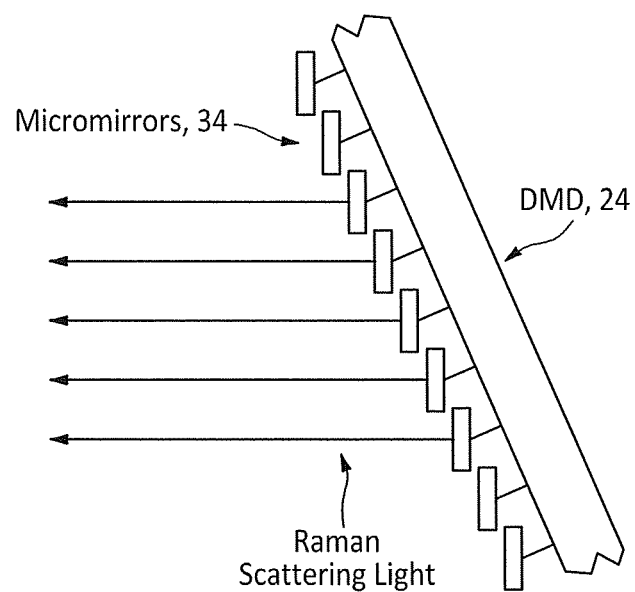
FIG. 4B schematically illustrates the micromirror array of FIG. 4A with all the micromirrors in an "off" state, in accordance with one or more aspects of the present disclosure.

Referring to FIGS. 4A and 4B, the plurality of micromirrors 34 in the DMD 24 can be selectively controlled or positioned between ON or OFF states by toggling individual micromirrors 34 to angular positions that deflect the Raman scattering light in a desired direction for collection by the light detector 26 or in a direction such that it will not be collected by the light detector 26. FIG. 4A diagrammatically illustrates a number of micromirrors 34 in an ON state and a number of micromirrors 34 in an OFF state. FIG. 4B diagrammatically illustrates all of the micromirrors 34 in an OFF state. Controlling certain micromirrors 34 into an OFF state (i.e., "turning off" certain pixels) creates an effective lower transmission (attenuation) of the system 20 for certain wavelengths over others, allowing spectral shapes to be accurately "mimicked" by the present disclosure system 20.

Figure 5:
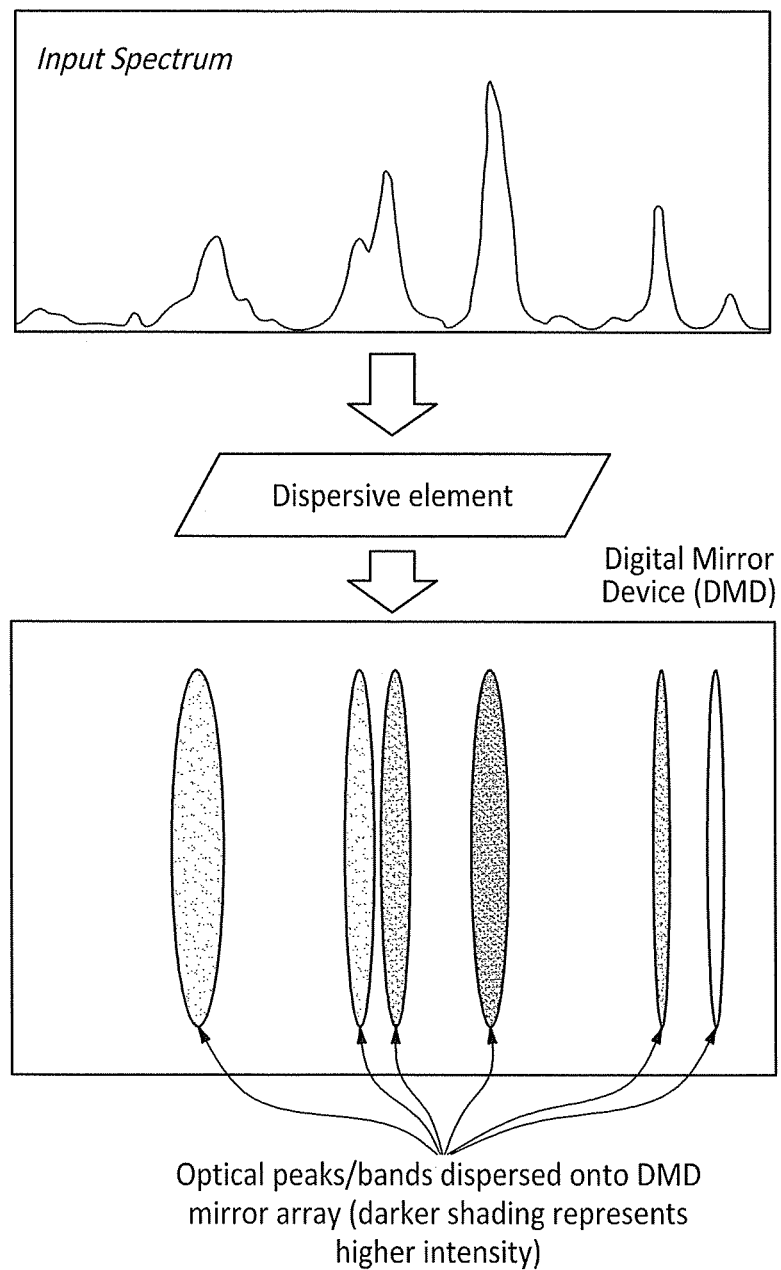
FIG. 5 diagrammatically illustrates a dispersion of an "input Raman spectrum" onto a digital mirror device (DMD), in accordance with one or more aspects of the present disclosure.

Referring to FIG. 5, the focusing elements of the present disclosure system 20 may be configured to create a highly asymmetric image on the DMD micromirror array, such that a Raman scattering peak at single wavenumber, spans in the vertical direction a column (or multiple thereof) of micromirrors 34. FIG. 5 diagrammatically optical peaks/bands dispersed onto a DMD array, with darker shades representing higher intensities. The optical peaks/bands shown in FIG. 5 are outlined to facilitate their identification.

As DMDs are commercially available in high density formats, the columns of the DMD micromirror array can be in excess of 1000 micromirrors 34 (or "pixels") high, giving an attenuation step resolution of 0.1% with one (1) micromirror turned off (this assumes uniform illumination of the light over a full column of micromirrors 34 with a one (1) micromirror width). In application, the micromirrors 34 can be dithered ON/OFF at MHz rates with duty cycles of approximately 10/90% to 90/10% (ON/OFF), allowing at least another order of magnitude control of attenuation, if required.

Figures 6A, 6B, 6C:
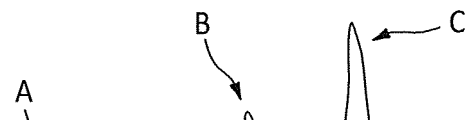
FIGS. 6A-6C illustrate the dispersion of the "input Raman spectrum" shown in FIG. 5 with several columns of DMD micromirror elements in an "off" state, and an output spectrum produced thereby.

FIGS. 6A-6C illustrate an example of how the present disclosure system 20 may be operated. The input Raman spectrum (e.g., a complex Raman "fingerprint" signature) is shown in FIG. 6A as having peaks A-D. Certain of the micromirrors 34 within the micromirror array (i.e., those associated with, and others adjacent peak "C") are placed in the OFF state as indicated by the shaded rectangular area on the DMD 24 surface shown in FIG. 6B. The input Raman spectrum incident to the DMD 24 is reflected from the DMD 24 and an output Raman spectrum (shown in FIG. 6C) is produced. As a result of those certain micromirrors 34 being placed in the OFF state, the signals associated with the peak "C" (shown in dashed lines to illustrate) are attenuated/blocked in the output Raman spectrum.

Figure 7A:
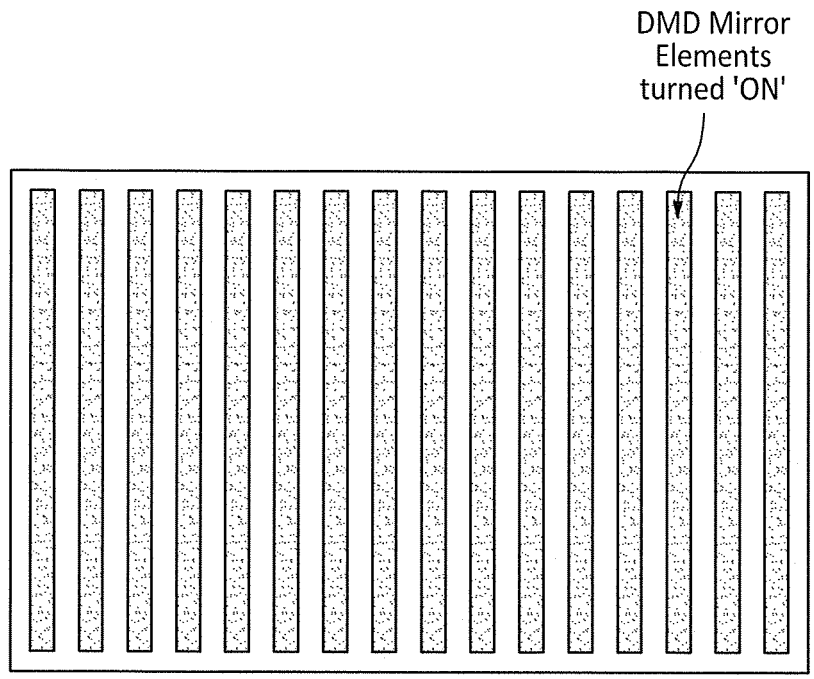
FIGS. 7A and 7B illustrate an exemplary DMD "map" of a spectral atom, in accordance with one or more aspects of the present disclosure.
Figure 7B:
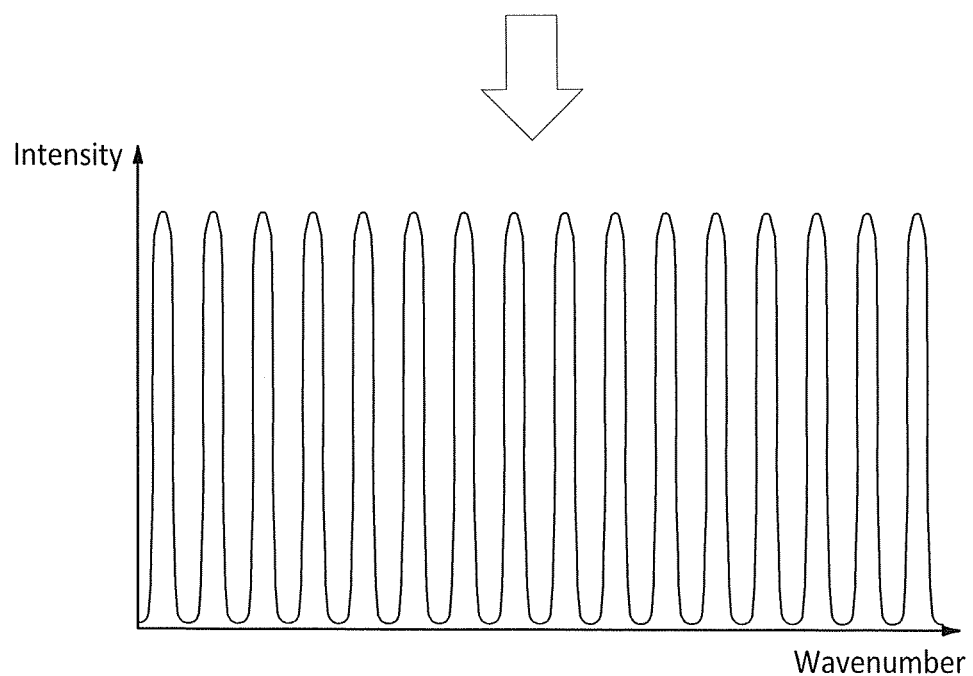
Figure 8A:
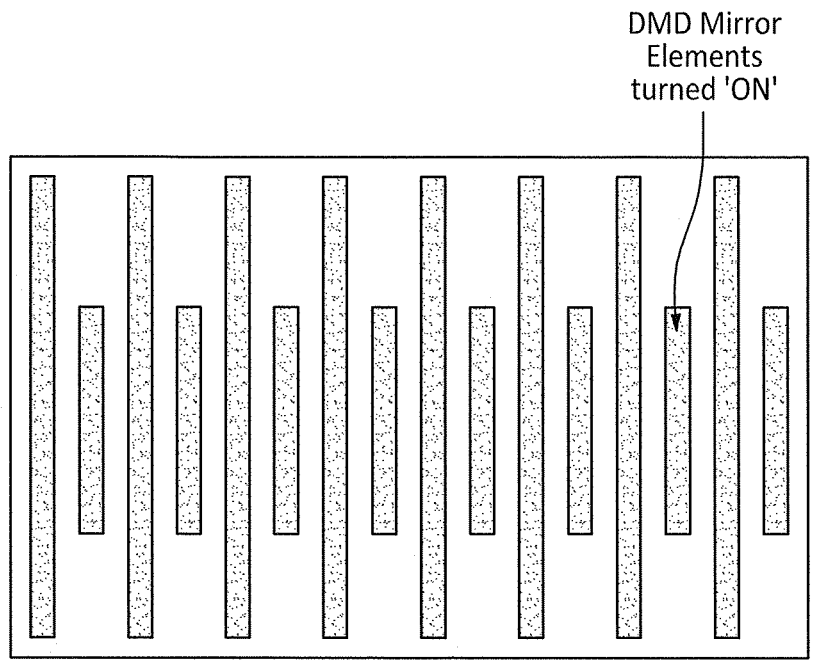
FIGS. 8A and 8B illustrate an exemplary DMD "map" of a spectral atom, in accordance with one or more aspects of the present disclosure.
Figure 8B:
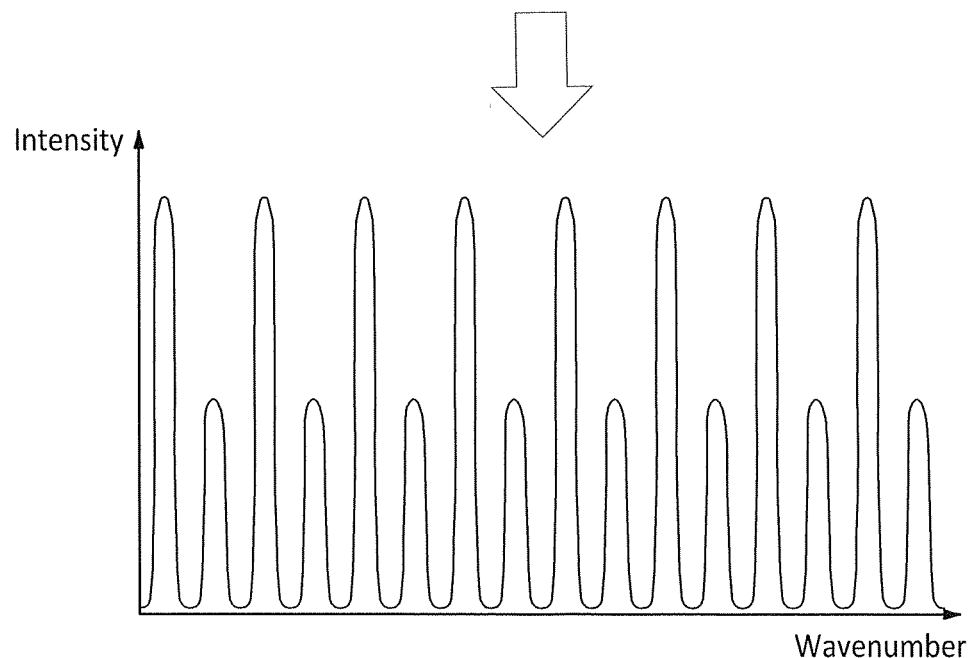
Figure 9A:
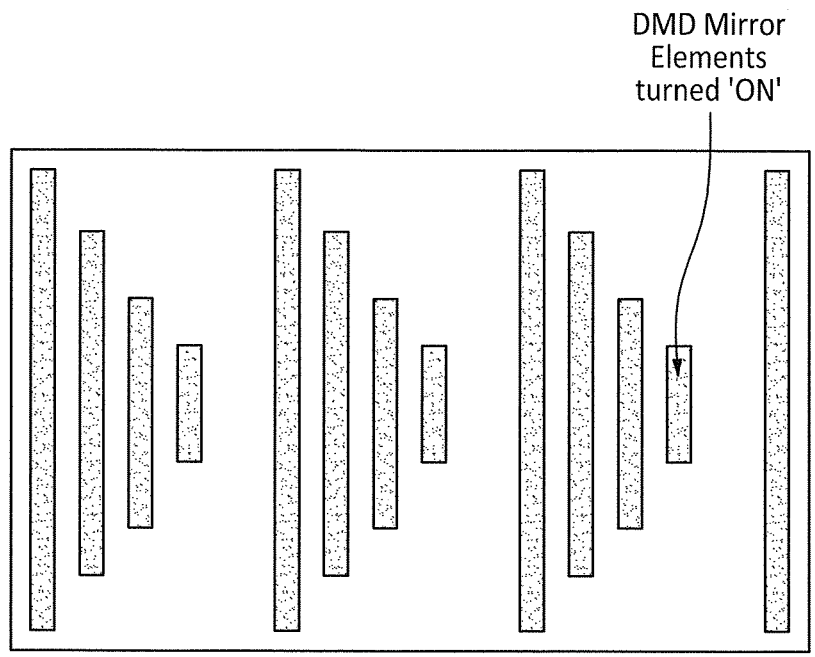
FIGS. 9A and 9B illustrate an exemplary DMD "map" of a spectral atom, in accordance with one or more aspects of the present disclosure.
Figure 9B:
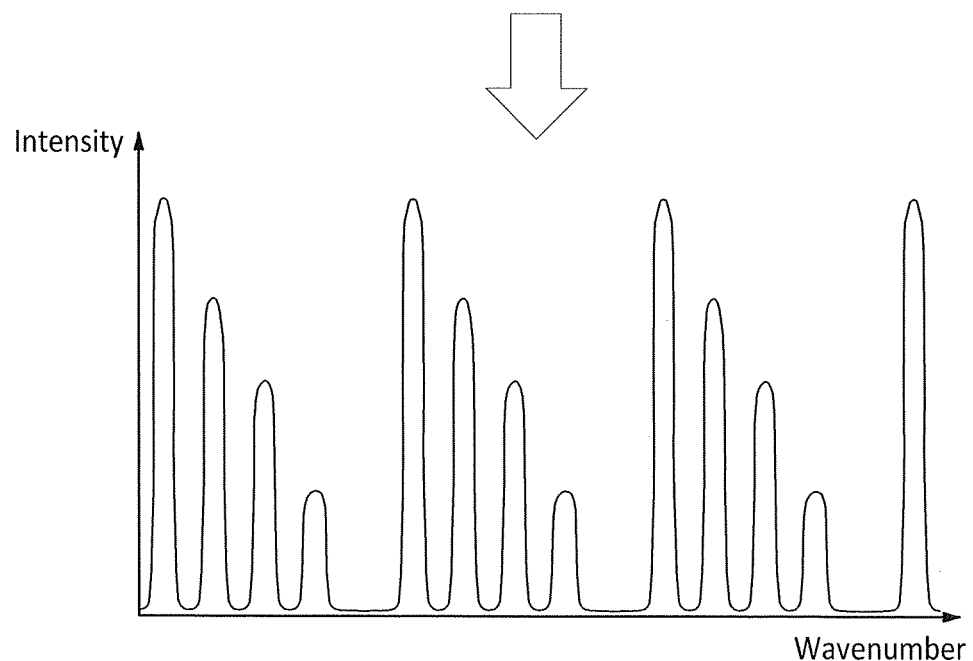
Figure 10A:
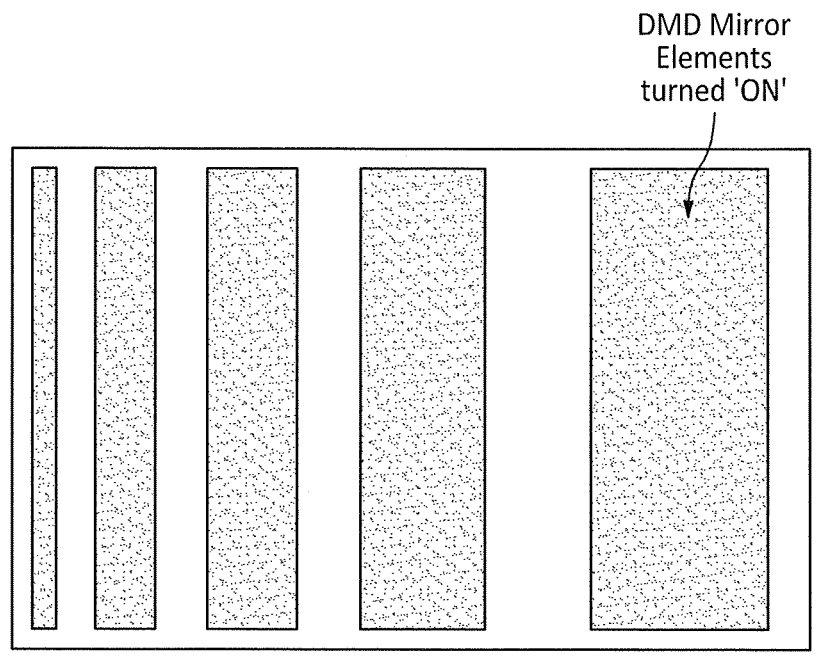
FIGS. 10A and 10B illustrate an exemplary DMD "map" of a spectral atom, in accordance with one or more aspects of the present disclosure.
Figure 10B:
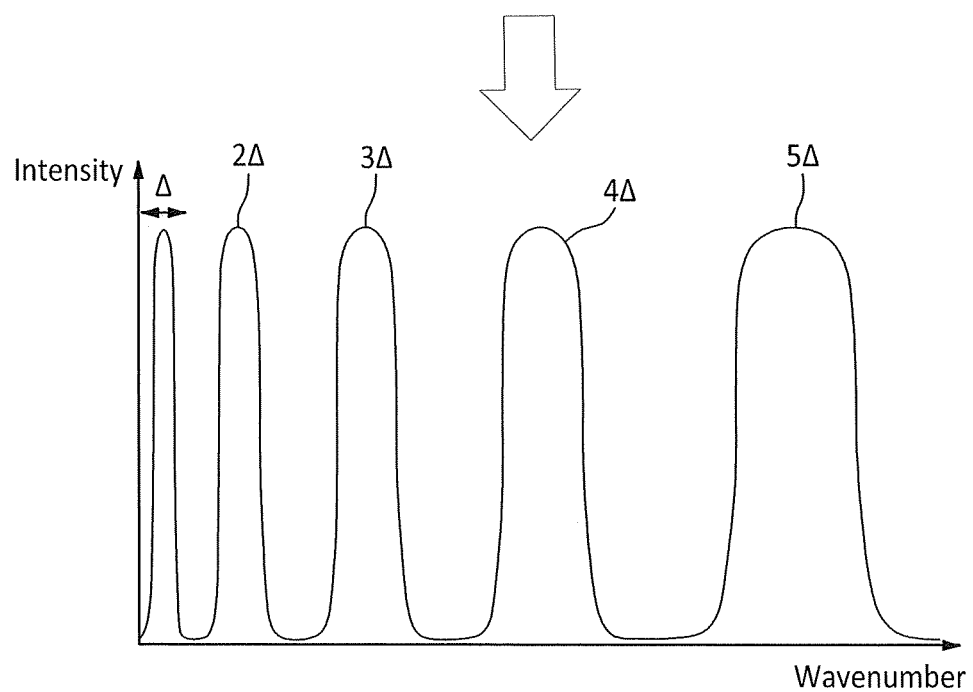

Referring to FIGS. 7A-10B, the adaptability of this present disclosure filtering technique is graphically illustrated in the form of spectral throughput for the system 20 with different arrangements of ON/OFF state blocks of micromirrors 34. The graphical depictions shown in FIGS. 7A-10B make clear that a universally broad set of spectral features and shapes could be generated and/or mimicked using the present disclosure system 20. FIG. 7A illustrates an exemplary DMD 24 "map" of a spectral atom having sixteen (16) equally spaced spectral bands over the wavenumber range of interest programmed to a repeated sequence 100% (ON state), 0% (OFF state) transmission and a theoretical spectral atom (FIG. 7B) corresponding to the exemplary digital mapping. FIG. 8A illustrates an exemplary DMD 24 "map" of a spectral atom having sixteen (16) equally spaced spectral bands over the wavenumber range of interest programmed to a repeated sequence 100%, 0% (ON/OFF state) and 50%, 0% (ON/OFF state) transmission and a theoretical spectral atom (FIG. 8B) corresponding to the exemplary digital mapping. FIG. 9A illustrates an exemplary DMD 24 "map" of a spectral atom having sixteen (16) equally spaced spectral bands over the wavenumber range of interest programmed to a repeated sequence 100%, 0% (ON/OFF state), 75%, 0% (ON/OFF state), 50%, 0% (ON/OFF state), 25%, 0% (ON/OFF state) transmission and a theoretical spectral atom (FIG. 9B) corresponding to the exemplary digital mapping. FIG. 10A illustrates an exemplary DMD 24 "map" of a spectral atom having five (5) spectral bands of different bandwidths (e.g., A, 2A, 3A, 4A, 5A) over the wavenumber range of interest and a theoretical spectral atom (FIG. 10B) corresponding to the exemplary digital mapping.

In some embodiments the present disclosure system 20 may be configured for rapid optical based recognition of spectral "atoms" or spectral features (spectral "sub atoms") present within incoming Raman light. In these embodiments, the system 20 may be configured to include a digital library of known spectral shapes ("atom library") that may be mapped onto the DMD micromirror array to mimic a desired spectral shape. The aforesaid atoms and their respective maps can be used to provide an indication of the "fit" or spectral concordance of the incoming Raman spectrum and the desired spectral atom; e.g., a quantified measure of the degree of concordance between the two. This spectral concordance may be referenced against an "inverse spectral atom," which can be used to quantify the degree to which the incoming Raman spectrum and the desired spectral atom are "out of concordance". The ratio of the concordance and out of concordance may be used as a measure of the correlation between the incoming Raman spectrum and the desired spectra atom.

Figure 11A:
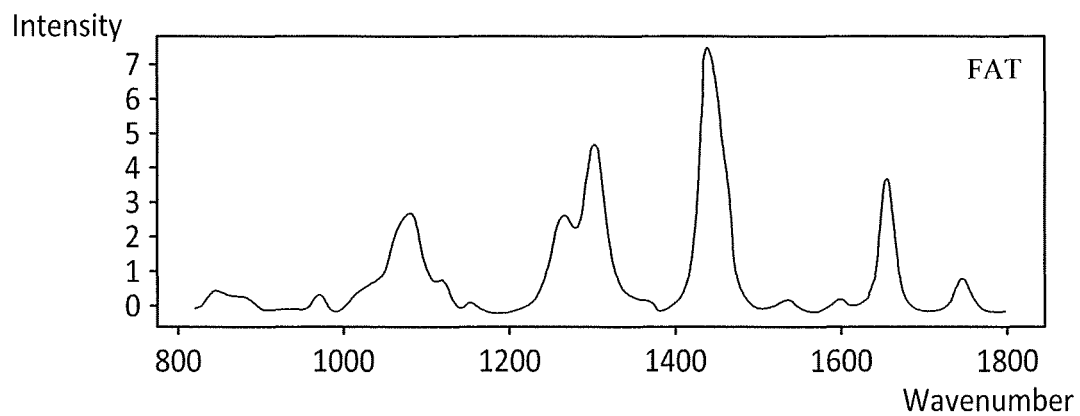
FIGS. 11A-C illustrate Raman spectral-atoms corresponding to Raman spectra for breast tissue, in accordance with one or more aspects of the present disclosure.
Figure 11B:
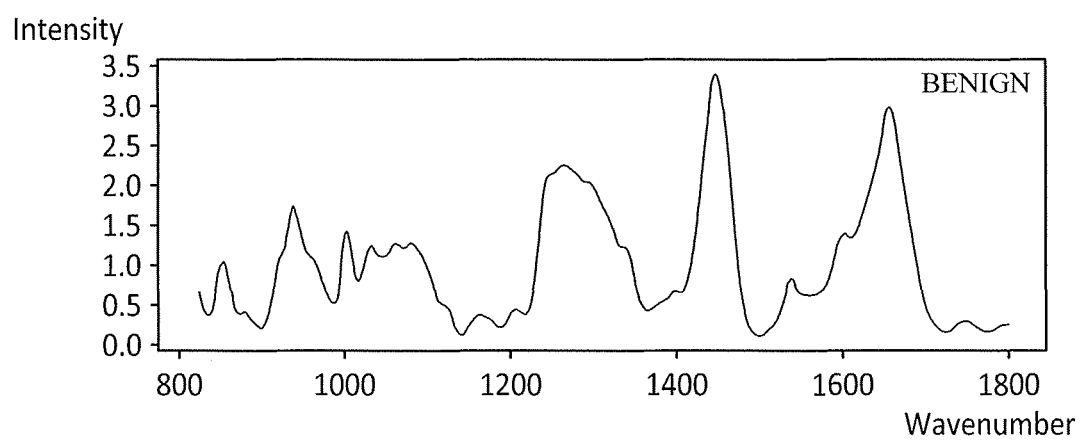
Figure 11C:
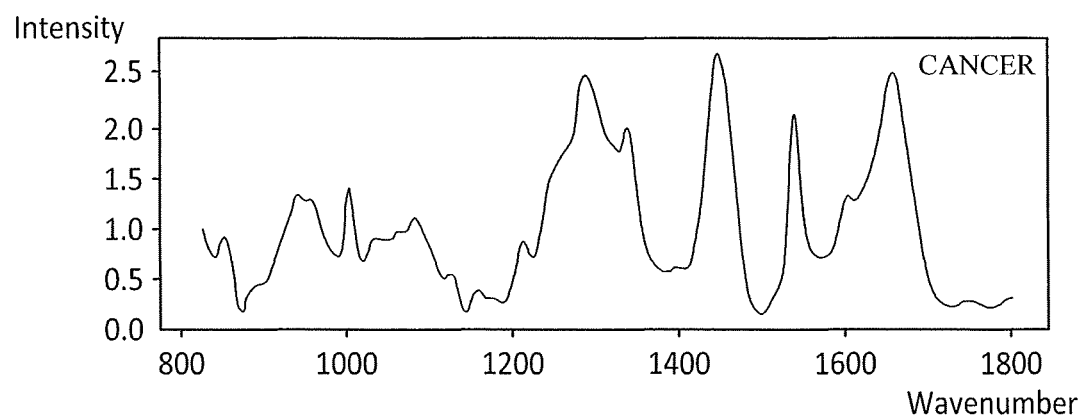
Figure 12A:
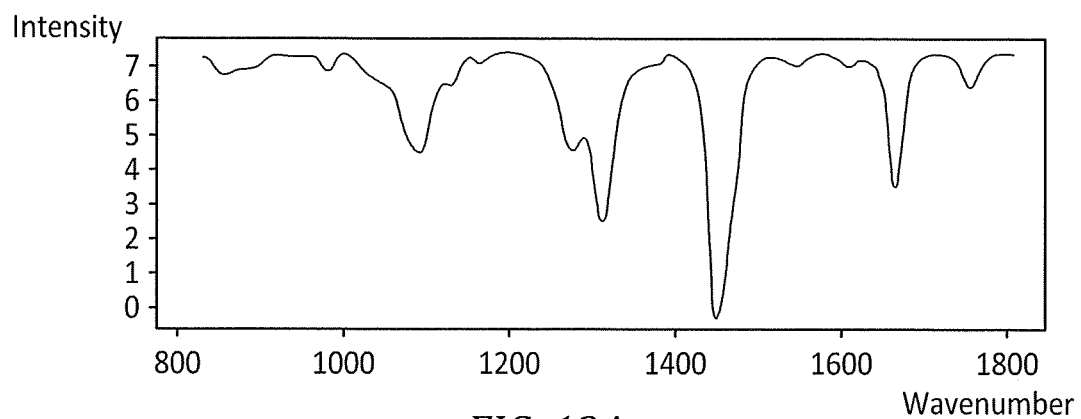
FIGS. 12A-C illustrate inverse Raman spectral-atoms corresponding to Raman spectra for breast tissue, in accordance with one or more aspects of the present disclosure.
Figure 12B:
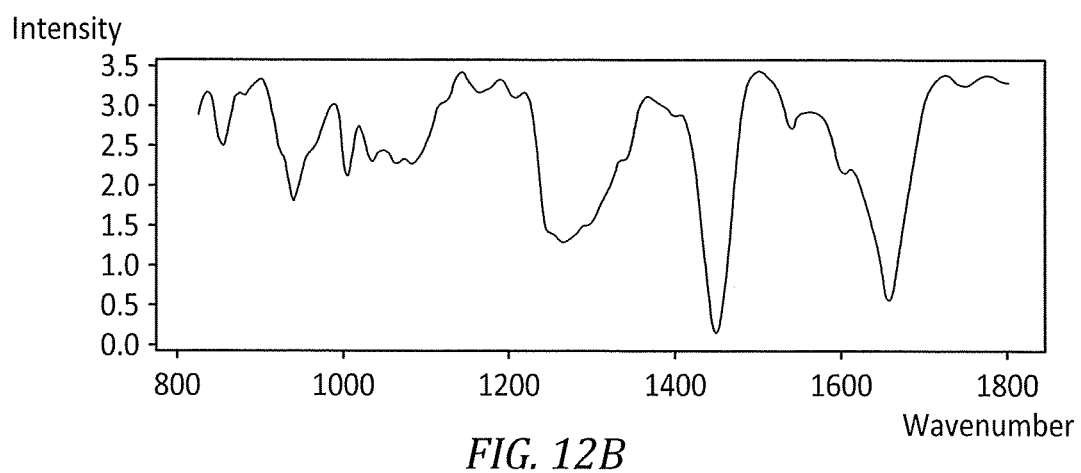
Figure 12C:
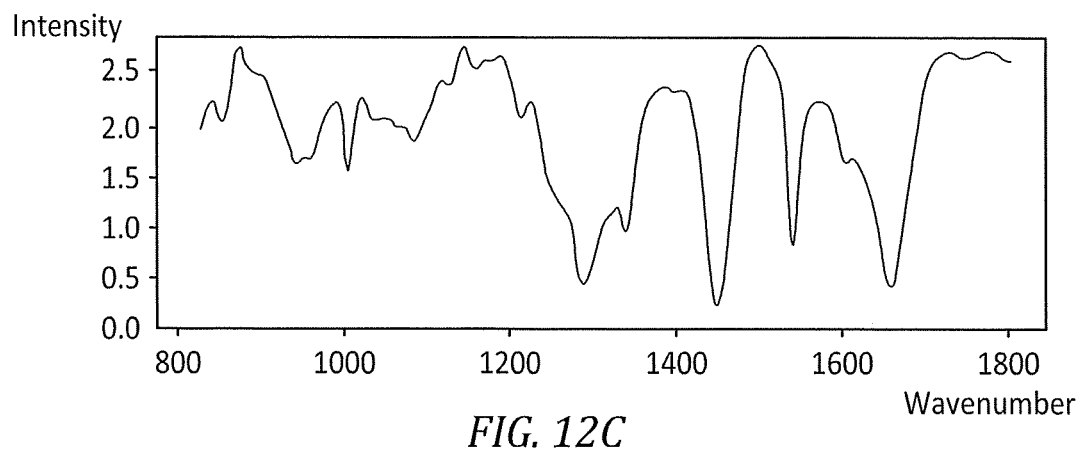

Examples of Raman spectral atoms and Raman inverse atoms for breast tissue are indicated in FIGS. 11A-C and 12A-C. FIG. 11A illustrates a Raman spectral atom for adipose (fat) tissue. FIG. 12A illustrates an inverse Raman spectral atom for adipose (fat) tissue. FIG. 11B illustrates a Raman spectral atom for benign tissue. FIG. 12B illustrates an inverse Raman spectral atom for benign tissue. FIG. 11C illustrates a Raman spectral atom for cancerous tissue. FIG. 12C illustrates an inverse Raman spectral atom for cancerous tissue. As indicated above, processing of Raman spectral signatures can be accomplished using a spectral atom (e.g., a normally oriented Raman spectral atom and/or an inversely oriented Raman spectral atom) associated with an entire Raman spectrum. Alternatively, the DMD 24 can be controlled to select one or more narrow-band portion of the Raman spectrum to focus on one or more particular spectral features or "spectral sub-atoms".

Figure 13:
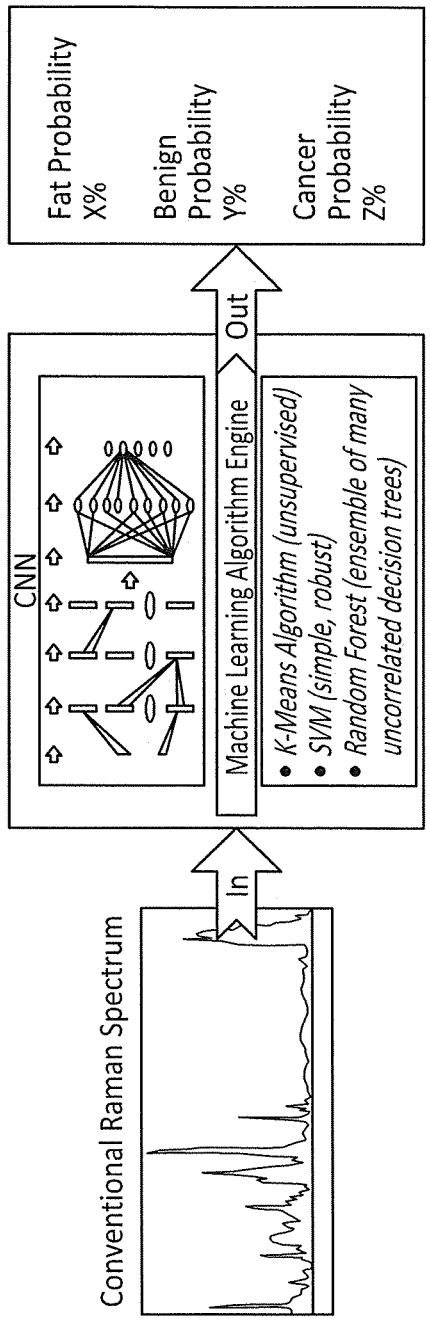
FIG. 13 illustrates a flow chart depicting a Raman spectrum as an input to a machine learning algorithm to generate a classification matrix, in accordance with one or more aspects of the present disclosure.

Referring to FIG. 13, some embodiments of the present disclosure may include an artificial intelligence/machine learning (AI/ML) algorithm that is trained to recognize Raman spectra associated with different tissue types, materials, compound types, compound formulations, etc. (referred to hereinafter collectively as "tissue types"). In these embodiments, identified Raman spectra (e.g., attained via a conventional Raman spectroscopy system) that are associated with each tissue type may be input into a machine learning system, such as a convolutional neural network (CNN), or a classifier such as a Random Forest processor, or the like. The Raman spectra input can be the full Raman spectrum, or a Raman spectrum reduced to a subset of spectral features, such as certain peaks within the Raman spectrum for example. Furthermore, an input Raman spectrum can be represented by "principal components" in a Principal Component Analysis. A PCA technique may be used to reduce the Raman spectrum to a number of "quotients" that describe "how much" of a particular component is in the Raman spectrum. These quotients, typically ranging from two (2) to as many as ten (10), may then input to the AI/ML algorithm. Typically, a full Raman spectrum has to be recorded and electronically post processed to allow this.

Figure 14:
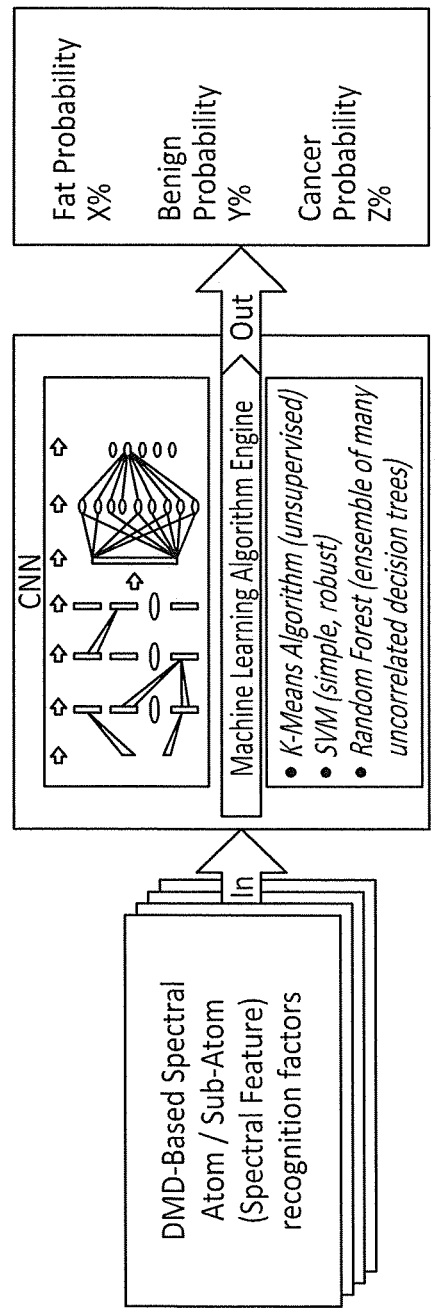
FIG. 14 illustrates a flow chart depicting spectral atom and/or sub-atom levels (factors) as inputs to a machine learning algorithm to generate a classification matrix, in accordance with one or more aspects of the present disclosure.

The AI system diagrammatically illustrated in FIG. 14, which may be included in some embodiments of the present disclosure, allows spectral features and/or photocurrent components to be analyzed directly in the optical domain by mimicking the spectral features or photocurrent spectral forms and thus performing direct correlations without the need to reduce the Raman spectra to an electronic form, thereby allowing a more simple and rapid assessment of the Raman signature and classification of the tissue type.

Figure 15:
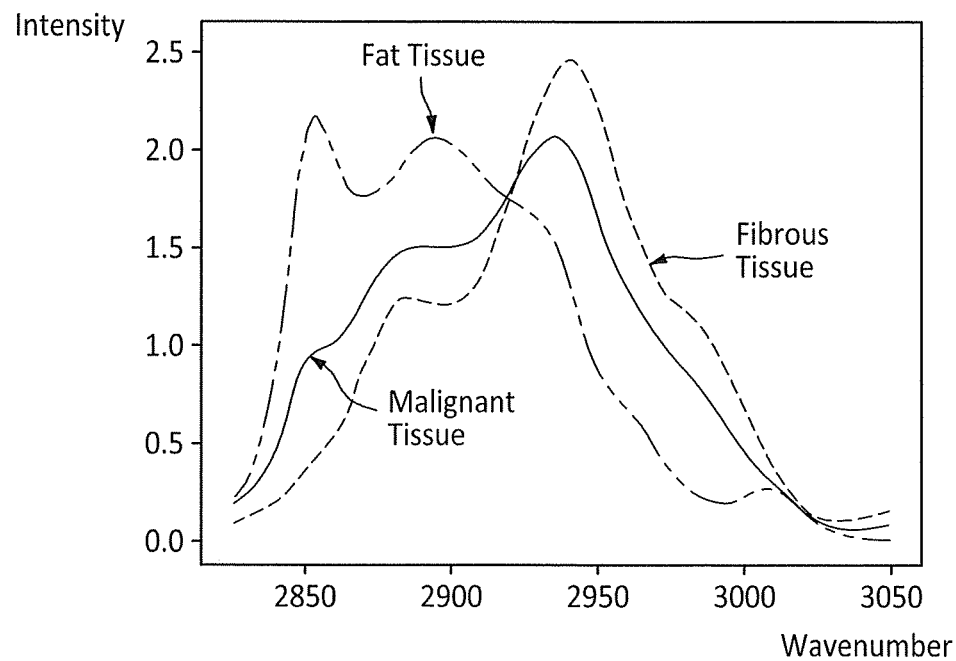
FIG. 15 illustrates exemplary Raman spectra for fat (adipose, benign fibrous, and cancerous tissue in a HWN Raman region, in accordance with one or more aspects of the present disclosure.
Figure 16:
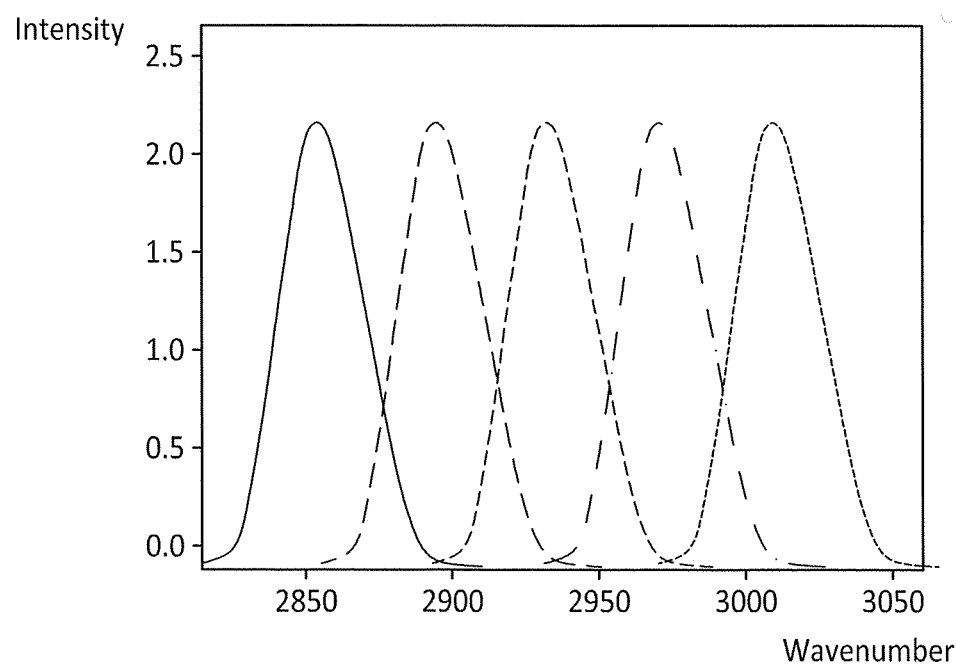
FIG. 16 illustrates representations of HWN Raman spectral sub-atoms which can be used to synthesize each of the spectral profiles in FIG. 15, in accordance with one or more aspects of the present disclosure.
Figure 17:
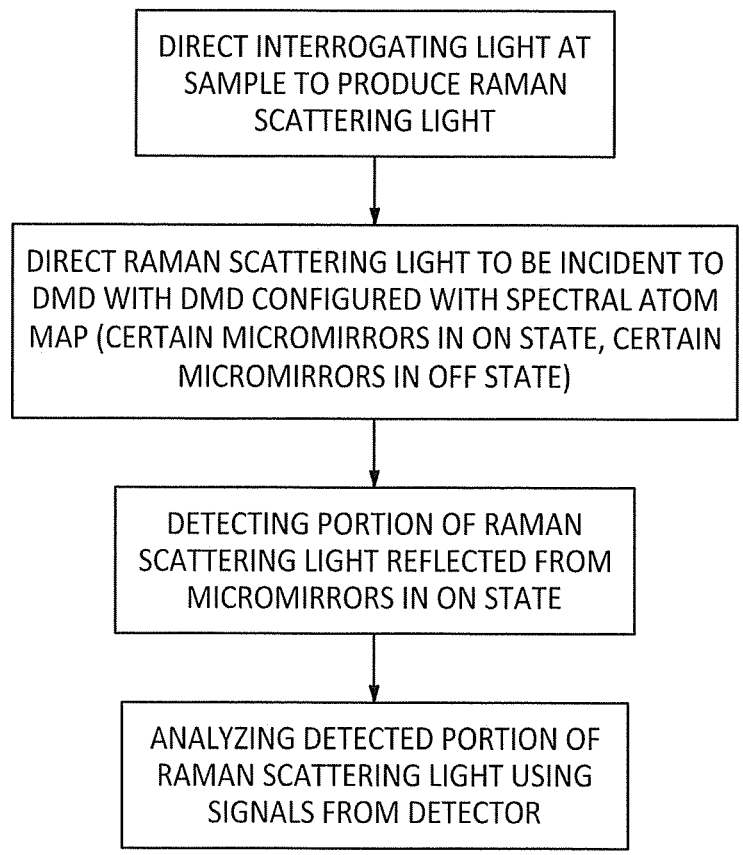
FIG. 17 illustrates a flow chart depicting a method for processing a Raman signature of a sample, in accordance with one or more aspects of the present disclosure.

FIG. 15 illustrates a typical HWN Raman spectrum for adipose (fat), benign fibrous, and cancerous tissue. FIG. 16 illustrates several exemplary HWN Raman spectral sub-atoms which can be used within the present disclosure to synthesize each of the Raman spectral profiles (e.g., adipose, benign fibrous, and cancerous tissue spectral profiles) illustrated in FIG. 15. As stated above, the spectral signature/fingerprint of certain materials, including but not limited to biological materials, may be more readily identifiable in the HWN region of Raman spectrum. Hence, the ability of the present disclosure to examine such materials in the HWN region can provide significant advantage. The present disclosure is not, however, limited to examining materials in the HWN region, however; e.g., the present disclosure may be used in the fingerprint region (FPR) as well.

Embodiments of the present disclosure may be configured to permit multiple spectral features/atoms/sub-atoms to be analyzed simultaneously in a multiplexed fashion. For example, different portion of a DMD 24 may be used, and/or a plurality of detectors 26 may be used to simultaneously analyze a plurality of spectral features/atoms/sub-atoms in a multiplexed fashion. In some present disclosure embodiments, Raman spectral atoms mapped onto a DMD 24 could be "dithered" along the horizontal direction (i.e., along the wavenumber axis) of the DMD 24 to allow more conventional cross-correlation processing to be performed. Embodiments of the present disclosure may be configured to perform this "dithering" technique to optimize the Raman spectral recognition processing. Further still, present disclosure embodiments may include other configurations of spatial light modulators that are adapted for use with the processing approaches described herein.

The detailed description of various embodiments herein refers to the accompanying drawings, which show various embodiments by way of illustration. While these various embodiments are described in sufficient detail to enable those skilled in the art to practice the inventions, it should be understood that other embodiments may be realized and that logical, chemical, and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented.

Furthermore, it is noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

REFERENCES

Each of the following references is hereby incorporated by reference in its entirety.
1. Smith, E., Dent, G., "Modern Raman Spectroscopy—A Practical Approach," John Wiley & Sons, 2005.
2. Kevin Buckley, Alan G. Ryder, "Applications of Raman Spectroscopy in Biopharmaceutical Manufacturing: A Short Review", Applied Spectroscopy, 71: 6, 1085-1116, 2017
3. Talari, A. et al., "Raman Spectroscopy of Biological Tissues", Applied Spectroscopy Reviews, 50:1, 46-111, 2015.
4. Tummers, et al., "Real-time intraoperative detection of breast cancer using near-infrared fluorescence imaging and methylene blue", Eur J Surg Oncol., 40(7), 850-858, 2014.
5. Matousek et al., "Noninvasive Raman spectroscopy of human tissue in vivo," Appl. Spectrosc. 60(7), 758-763, 2006.
5. Mahadevan-Jansen, Richards-Kortum, "Raman spectroscopy for the detection of cancers and precancers", J Biomed Opt.; 1(1):31-70, 1996.
6. Jain, R.; et al. "Raman Spectroscopy Enables Noninvasive Biochemical Characterization and Identification of the Stage of Healing of a Wound". Analytical Chemistry. 86 (8): 3764-3772 (2014).
7. West M, Went M., "Detection of drugs of abuse by Raman spectroscopy", Drug Test Anal., 3(9): 532-8, 2010.
8. Taylor, P. D. et al., "Raman spectroscopic study of the mineral composition of cirratulid tubes (Annelida, Polychaeta)". Journal of Structural Biology, 171 (3): 402-405 (2010).
9. Macleod N., Matousek P., "Deep noninvasive Raman spectroscopy of turbid media", Appl Spectrosc. 62(11): 291A-304A, 2008.
10. K. Lin, et al., "Optical diagnosis of laryngeal cancer using high wavenumber Raman spectroscopy," Biosens. Bioelectron. 35(1), 213-217 (2012).
11. Rishikesh Pandey, Gary Root, Machele Riccio, Michael Sapack, Noel Daigneault, David Fournier, Patrick Curry, and Alan Kersey "Raman spectroscopy based molecular bar coding: realizing the value of high wavenumber region in breast cancer detection", Proc. SPIE 11631, Advanced Biomedical and Clinical Diagnostic and Surgical Guidance Systems XIX, 1163105 (5 Mar. 2021); https://doi.org/10.1117/12.2578933,
12. Keller M. D. et al., "Spatially offset Raman spectroscopy of layered soft tissues", Opt Lett., 34(7): 926-8, 2009.

13. Stone et al., "Subsurface probing of calcifications with spatially offset Raman spectroscopy (SORS): future possibilities for the diagnosis of breast cancer", Analyst; 132(9): pp. 899-905 2007.
14. Jiang H et al., "Three-dimensional optical tomographic imaging of breast in a human subject", IEEE Trans Med Imaging. 20(12):1334-40, 2001
15. Dahr et al., "A diffuse reflectance spectral imaging system for tumor margin assessment using custom annular photodiode arrays", Biomedical Optics Express, 3, (12), 2012.
16. Nguyen and Tsien, "Fluorescence-guided surgery with live molecular navigation—a new cutting edge", Nat Rev Cancer, 13(9), pp. 653-662, 2013.
17. Nioka S, Chance B., "NIR spectroscopic detection of breast cancer", Technol Cancer Res Treat., 4(5): 497-512, 2005.
18. Fujimoto J G, "Optical coherence tomography for ultra-high resolution in vivo imaging," Nat Biotechnol., 21(11): 1361-7, 2003.
19. Pence I., Mahadevan-Jansen A., "Clinical instrumentation and applications of Raman spectroscopy", Chem Soc Rev.; 45 (7):1958-1979, 2016.
20. Yaroslaysky. A, et al., "Delineating nonmelanoma skin cancer margins using terahertz and optical imaging", J of Biomedical Photonics & Eng., 3(1), 2017.
21. Qian X, et al. In vivo tumor targeting and spectroscopic detection with surface-enhanced Raman nanoparticle tags. Nat Biotechnol. 26: 83-90, 2008.
22. Dinish et al., "Actively targeted in vivo multiplex detection of intrinsic cancer biomarkers using biocompatible SERS nanotags", Sci Rep.; 12, 4:4075, 2014.
23. Abigail S. Haka et al., "Diagnosing breast cancer by using Raman spectroscopy", PNAS, 102, pp. 12371-12376, 2005.
24. Applications of Spatial Light Modulators in Raman Spectroscopy—Faris Sinjab, Zhiyu Liao, Ioan_Notingher, 2019 (www.sagepub.com).

The invention claimed is:
1. A system for processing Raman scattering light from a sample, the system comprising:
at least one light source;
a digital mirror device (DMD) configured to reflect said Raman scattering light, the DMD comprising a plurality of micromirrors each selectively controllable between at least an ON state and an OFF state;
at least one light detector configured to detect said Raman scattering light and to produce signals representative of the detected said Raman scattering light; and
an analyzer in communication with the at least one light source, the DMD, the at least one detector, and a non-transitory memory storing instructions, which instructions when executed cause the analyzer to:
control the at least one light source to produce a beam of light for interrogating the sample;
control the DMD to place respective ones of the plurality of micromirrors in an ON state or an OFF state based on one or more known spectral shapes stored in the memory; and
process said Raman scattering light reflected by the micromirrors in the ON state and detected by the detector.
2. The system of claim 1, wherein the instructions when executed cause the analyzer to control the DMD to place respective ones of the plurality of micromirrors in an ON state or an OFF state to create a pattern that is representative of the one or more known spectral shapes stored in the memory.
3. The system of claim 1, wherein the instructions when executed cause the analyzer to control the DMD to place respective ones of the plurality of micromirrors in an ON state or an OFF state to create a pattern that encompasses the one or more known spectral shapes stored in the memory.
4. The system of claim 1, wherein the one or more known spectral shapes stored in the memory includes at least one said spectral shape that is representative of a Raman spectrum having a plurality of peaks.
5. The system of claim 1, wherein the one or more known spectral shapes stored in the memory includes at least one said spectral shape that is representative of less than an entire Raman spectrum having a plurality of peaks.
6. The system of claim 5, wherein the at least one said spectral shape that is representative of less than said entire Raman spectrum is representative of a single said peak.
7. The system of claim 1, wherein the Raman scattering light is in a high wavenumber region.
8. The system of claim 1, wherein the instructions when executed cause the analyzer to process the Raman scattering light, including causing the analyzer to quantify a level of concordance between the detected Raman scattering light and at least one of the one or more known spectral shapes.
9. The system of claim 1, wherein the instructions when executed cause the analyzer to process the Raman scattering light, including causing the analyzer to quantify a level of out of concordance between the detected Raman scattering light and an inverse of at least one of the one or more known spectral shapes.
10. The system of claim 1, wherein the instructions when executed cause the analyzer to process the Raman scattering light, including causing the analyzer to:
quantify a level of concordance between the detected Raman scattering light and at least one of the one or more known spectral shapes;
quantify a level of out of concordance between the detected Raman scattering light and an inverse of the at least one of the one or more known spectral shapes; and
determine a ratio of the level of concordance and the level of out of concordance.
11. The system of claim 1, wherein the system includes a first dispersion element configured to disperse the Raman scattering light, and the first dispersion element is disposed to receive the Raman scattering light from the sample prior to Raman scattering light being incident to the DMD.
12. The system of claim 11, wherein the system includes a second dispersion element configured to disperse the Raman scattering light, and the second dispersion element is disposed to receive the Raman scattering light reflected from the DMD, and the second dispersion element is configured to pass the Raman scattering light directly or indirectly to the detector.
13. The system of claim 1, further comprising one or more optical elements that are configured to create an asymmetric image on the DMD, wherein the asymmetric image is such that a Raman scattering peak at a wavenumber spans in a vertical direction to align with one or more columns of said micromirrors in the DMD.
14. The system of claim 1, wherein the instructions when executed cause the analyzer to control the DMD to place respective ones of the plurality of micromirrors in an ON state or an OFF state to filter one or more peaks in a spectrum of said Raman scattering light.

15. A method for processing Raman scattering light from a sample, the method comprising:
- directing a beam of light at the sample to produce Raman scattering light from the sample;
- controlling a digital mirror device (DMD), the DMD comprising a plurality of micromirrors each selectively controllable between at least an ON state and an OFF state, the controlling said DMD including placing respective ones of the plurality of micromirrors in an ON state or an OFF state based on one or more known spectral shapes;
- receiving, with a detector, at least a portion of the Raman scattering light reflected by the plurality of micromirrors in the ON state, and producing signals representative of the received at least a portion of the Raman scattering light; and
- processing said Raman scattering light reflected by the micromirrors in the ON state and detected by the detector using the signals representative of the received at least a portion of the Raman scattering light.

16. The method of claim 15, wherein the step of controlling the DMD includes placing respective ones of the plurality of micromirrors in an ON state or an OFF state to create a pattern that is representative of the one or more known spectral shapes.

17. The method of claim 15, wherein the step of controlling the DMD includes placing respective ones of the plurality of micromirrors in an ON state or an OFF state to create a pattern that encompasses the one or more known spectral shapes.

18. The method of claim 15, wherein the step of processing said Raman scattering light includes quantifying a level of concordance between the detected Raman scattering light and at least one of the one or more known spectral shapes.

19. The method of claim 15, wherein the step of processing said Raman scattering light includes quantifying a level of out of concordance between the detected Raman scattering light and an inverse of at least one of the one or more known spectral shapes.

20. The method of claim 15, wherein the step of processing said Raman scattering light includes:
- quantifying a level of concordance between the detected Raman scattering light and at least one of the one or more known spectral shapes;
- quantifying a level of out of concordance between the detected Raman scattering light and an inverse of the at least one of the one or more known spectral shapes; and
- determining a ratio of the level of concordance and the level of out of concordance.

* * * * *